United States Patent
Masini

(10) Patent No.: US 9,180,627 B2
(45) Date of Patent: Nov. 10, 2015

(54) PROCESS FOR MANUFACTURING ARTICLES IN CARBON FIBER AND ARTICLE MANUFACTURED WITH THIS PROCESS

(71) Applicant: Automobili Lamborghini S.p.A., Sant'Agata Bolognese (IT)

(72) Inventor: Attilio Masini, Monteveglio (IT)

(73) Assignee: AUTOMOBILI LAMBORGHINI S.P.A., Sant'agata Bolognese Bo (IT)

( * ) Notice: Subject to any disclaimer, the term of this patent is extended or adjusted under 35 U.S.C. 154(b) by 0 days.

(21) Appl. No.: 14/371,235

(22) PCT Filed: Feb. 11, 2013

(86) PCT No.: PCT/IB2013/051115
§ 371 (c)(1),
(2) Date: Jul. 9, 2014

(87) PCT Pub. No.: WO2013/128312
PCT Pub. Date: Sep. 6, 2013

(65) Prior Publication Data
US 2014/0378582 A1 Dec. 25, 2014

(30) Foreign Application Priority Data
Feb. 28, 2012 (IT) .............................. MI2012A0307

(51) Int. Cl.
*B29C 70/34* (2006.01)
*B29C 70/44* (2006.01)
(Continued)

(52) U.S. Cl.
CPC ............... *B29C 70/342* (2013.01); *B29C 70/44* (2013.01); *B29C 70/46* (2013.01); *B29C 70/545* (2013.01); *C08J 5/24* (2013.01); *B29K 2101/10* (2013.01);
(Continued)

(58) Field of Classification Search
None
See application file for complete search history.

(56) References Cited

U.S. PATENT DOCUMENTS

| 4,855,097 A | 8/1989 | Iseler et al. |
| 6,454,893 B1 | 9/2002 | McKague, Jr. |
| 6,797,379 B2 | 9/2004 | Van Dijk et al. |

OTHER PUBLICATIONS

Mark Bruderick, Douglas Denton, Michael Shinedling, and Michael Kiesel; Applications of Carbon Fiber SMC for the Dodge Viper; 2002.*

*Primary Examiner* — Benjamin Schiffman
(74) *Attorney, Agent, or Firm* — Lucas & Mercanti, LLP

(57) ABSTRACT

The invention relates to a heat compression molding process for the manufacturing of composite material articles, the process comprising the steps of i) providing a mold (20) in which the negative shape (31, 32) of an article (30) to be manufactured is formed; ii) inserting into said mold (20) an SMC semi-finished product (10) comprising one or more sheets of composite material comprising a matrix of a heat-hardening resin and carbon fibers, the mold being pre-heated at a temperature suitable to allow the cure of said heat-hardening resin; iii) closing the mold (20) and carrying out a compression cycle in an autoclave according to a predefined time-pressure law; and iv) extracting the article (30), wherein the amount of SMC semi-finished product (10) inserted in the mold (20) is calculated by weighing on the basis of the volume of the article (30) to be manufactured. The size of the surfaces of the SMC semi-finished product (10) intended to contact the surfaces of the shape (31, 32) are calculated so as to cover said surfaces in a percentage comprised between 70 to 99%, in particular higher than 80% and less than or equal to 99%. Thanks to these characteristics it is possible to obtain manufactured articles substantially free from surface defects and suitable for both structural and aesthetic uses.

12 Claims, 2 Drawing Sheets

(51) Int. Cl.
  *B29C 70/46* (2006.01)
  *B29C 70/54* (2006.01)
  *C08J 5/24* (2006.01)
  *B29K 101/10* (2006.01)
  *B29K 105/08* (2006.01)
  *B29K 307/04* (2006.01)
  *B29L 31/30* (2006.01)

(52) U.S. Cl.
  CPC ..... *B29K 2105/0863* (2013.01); *B29K 2307/04* (2013.01); *B29L 2031/3005* (2013.01)

PROCESS FOR MANUFACTURING ARTICLES IN CARBON FIBER AND ARTICLE MANUFACTURED WITH THIS PROCESS

CROSS-REFERENCE TO RELATED APPLICATIONS

This application is a 371 of PCT/IB2013/051115, filed Feb. 11, 2013, which claims the benefit of Italian Patent Application No. MI2012A000307, filed Feb. 28, 2012, the contents of each of which are incorporated herein by reference.

FIELD OF THE INVENTION

The present invention relates to the field of manufacturing articles in composite materials. More particularly, the invention relates to a heat compression molding process for the manufacture of articles in composite materials comprising carbon fibers and an article manufactured with this process.

BACKGROUND OF THE INVENTION

Known processes for manufacturing articles in composite materials use the technology of heat compression molding, in which measured quantities of materials comprising a heat-hardening matrix reinforced with fibers of rigid materials are inserted into molds made of steel or aluminum suitable to a confer a predetermined shape to the article. This technology, created for molding articles reinforced with glass fibers but today increasingly used also for articles reinforced with carbon fibers, allows to obtain components characterized by low weight and excellent mechanical properties, as well as good dimensional tolerances.

The heat compression molding technology is very suitable for the manufacture of articles substantially free from undercut details, obtainable with molds made up of two overlapping parts inside which the shape of the article is formed in negative and in two portions.

In a typical process of heat compression molding for articles of composite material based on carbon fibers, semi-finished products made of heat-hardening resins and carbon fibers are used. These semi-finished products, manufactured in processes separate from the compression molding process, are in the form of pre-impregnated sheets known in the industry with the English acronym "SMC" (Sheet Molding Compound).

The SMC semi-finished products generally comprise a plurality of pre-impregnated sheets superimposed so as to form a single block. Before being loaded into the mold, an SMC semi-finished products can be advantageously subjected to a heating treatment, for example by means of infrared rays, which facilitates its arrangement in the mold and allows to reduce the curing time of the heat-hardening resin.

In order to control features such as the dimensional shrinkage during the hot crosslinking phase, the surface finishing, the ease of detachment from the molds and the behavior in fire, the heat-hardening resins are usually charged with mineral charges, lubricants, release agents, flame retardants and the like. Calcium carbonate, kaolin, stearates, oxides and hydrates of calcium, magnesium, aluminum are some of the most used additives.

Thanks to the low weights and the high mechanical characteristics, the articles in composite materials with carbon fibers made with the heat compression molding technology starting from SMC semi-finished products have been used for some years in the automotive industry for the production of structural components such as, for example, supports for lights, windscreen frames and supporting elements of bodywork parts.

Nevertheless, these articles are not generally used for the manufacture of aesthetic elements of a vehicle, such as, for example, bodywork parts and details of the passenger compartment, due to their rather coarse surface finishing. In particular, an article of composite material made starting from SMC semi-finished products has surface defects such as, for example, porosity and undulations that are even visible to the naked eye and that therefore, despite the excellent mechanical characteristics, make it unsuitable for a use also or exclusively aesthetic.

U.S. Pat. No. 4,855,097 describes a method for making an exterior automotive body panel by compression molding in which a charge containing a curable resin covers from 40% to 80% of the surface area of the molding surface. According to this known document coverages higher than 80% do not permit sufficient flow of charge necessary to provide a slight movement of the same.

SUMMARY OF THE INVENTION

The object of the present invention is therefore to provide a process for the manufacture of articles in composite materials comprising carbon fibers, which is free from said drawbacks, as well as an article manufactured with this process. Said object is achieved with a process and an article whose main features are specified in the claims.

An idea of solution underlying the present invention is to minimize the sliding of the material of the SMC semi-finished products in order to minimize the formation of surface defects. The inventors have found that the presence of surface defects such as porosity and undulations is strongly influenced by the flow of the composite material loaded into the mold, which determines different orientations of the carbon fibers in different areas of the finished article. In particular, it has been observed that in an article of composite material based on carbon fibers made according to known heat compression molding processes, the surface portions with less surface defects are those in which the fiber orientation is substantially identical to the one of the SMC semi-finished product introduced into the mold.

To obtain an article free from surface defects, according to the invention the loading of the SMC semi-finished product in the mold is done by calculating both the weight suitable to allow the complete filling of the shape corresponding to the shape of the article, and the surface development of the shape formed in the mold and by making sure that the surfaces of the semi-finished product cover the surfaces of the shape in a percentage comprised between 70 and 99%, in particular higher than 80% and less than or equal to 99%. Thanks to these characteristics it is possible to minimize the sliding of the composite material in the mold, and thus of the carbon fibers, thereby significantly reducing the formation of surface defects, in particular porosity and undulations. Consequently, the articles made according to the process of the invention are suitable for both structural and aesthetic uses, as for example for the manufacture of bodywork components for motor vehicles and/or covering elements for passenger compartments, which particulars were not achievable so far with the known heat compression molding processes of SMC articles.

According to a preferred embodiment, the process of the invention comprises a step of adding at least one layer of a pre-impregnated fabric with unidirectional carbon fibers, in which step said at least one layer is arranged in contact with one or both surfaces of the SMC semi-finished product which are intended to come into contact with the surfaces of the shape of the article formed in the mold.

To facilitate the evacuation of air and any other volatile substances trapped between the SMC semi-finished product and the one or more layers of pre-impregnated fabric superimposed to it, it is advantageous to produce cuts on the unidirectional fibers. This makes it possible to avoid the formation of bubbles and thus to further improve the surface finishing of the article.

In order not to weaken the layer of pre-impregnated fabric of unidirectional fibers, the cuts are preferably inclined with respect to the fiber direction and misaligned with each other in the same direction. Furthermore, the cuts have a predetermined length and relative distance.

As an alternative to the layer of pre-impregnated fabric of unidirectional carbon fibers, it is possible to use a sheet of nonwoven fabric made of carbon fiber, fiberglass or acrylic material which, as in the previous case, can be arranged in contact with one or both surfaces of the SMC semi-finished product intended to come into contact with the surfaces of the shape formed in the mold.

The use of one or more layers of pre-impregnated fabric of unidirectional fibers or of one or more sheets of a nonwoven carbon fabric is advantageous since it allows to further improve the surface finishing, thereby obtaining a product essentially free from surface defects. In fact, such layers or sheets have surface finishing features even higher than those of the SMC semi-finished products.

It is also possible to provide the combined use of at least one layer of a pre-impregnated fabric of unidirectional carbon fibers and at least one sheet of nonwoven carbon fabric.

Another advantage offered by the invention is that the heat compression molding process does not entail increased costs compared to a heat compression molding process of the traditional type.

BRIEF DESCRIPTION OF THE DRAWINGS

Further advantages and characteristics of the process for manufacturing composite material comprising carbon fibers according to the present invention will become apparent to those skilled in the art from the following detailed and non-limiting description of an embodiment thereof with reference to the accompanying drawings in which.

DETAILED DESCRIPTION OF THE INVENTION

Figure 1:
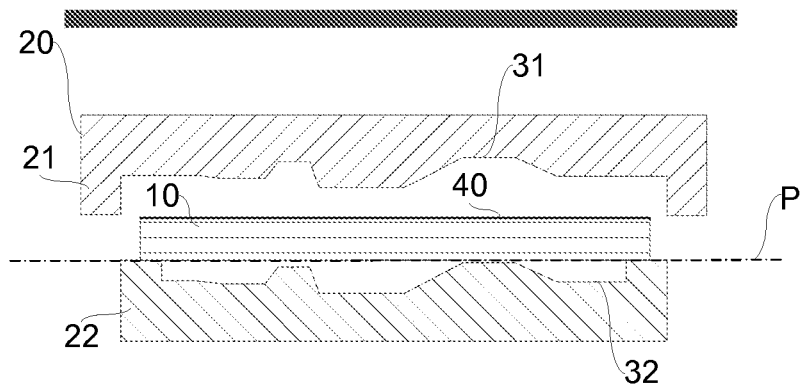
FIGS. 1 to 3 show schematically the main steps of a heat compression molding process of an article made of composite material according to the invention.

An SMC semi-finished product 10 comprising one or more sheets of composite material comprising a matrix of heat-hardening resin and carbon fibers is inserted into a mold 20 in which the shape of an article 30 to be manufactured in formed in negative. As it is known, the shape of the article is divided into two portions along an opening plane P of the mold to allow the insertion of the SMC semi-finished product and the extraction of the finished article. The surfaces forming the shape in negative of the article 30 are indicated with the reference numbers 31, 32, and are formed in a first portion 21 and a second portion 22, respectively, of the mold 20.

The heat-hardening resin used in the SMC semi-finished product is preferably selected from the group comprising vinyl-ester, phenolic, epoxy, polyester, polyamide, cyano-ester resins or combinations thereof.

The carbon used is in the form of filaments of length comprised between 5 and 200 mm, preferably equal to 1 inch (25.4 mm). Each carbon filament is composed of a number of carbon fibers comprised between 3000 and 24000 fibers, preferably equal to about 12000 fibers. The amount of carbon fibers varies from 25% to 75% by weight of the heat-hardening resin, and is preferably equal to 50% by weight.

To obtain an article, the mold 20 is preheated to a suitable temperature to allow the crosslinking of the heat-hardening resin that constitutes the matrix of the SMC semi-finished product. In the case of the above mentioned heat-hardening resins, this temperature is for example comprised between 120 and 150° C., and preferably equal to 130° C.

The amount of SMC semi-finished product introduced into the mold is calculated by weighing on the basis of the volume of the article to be manufactured.

According to the present invention, in addition to the calculation of the weight of the SMC semi-finished product, the dimensions of the surfaces of the SMC semi-finished product intended to come into contact with the surfaces 31, 32 of the shape formed in the mold 20 are calculated so as to cover these surfaces in a percentage comprised between 70 and 99%, in particular higher than 80% and less than or equal to 99%. Thanks to these characteristics, the sliding of the material during the closing phase of the mold and the subsequent stages of compression is extremely limited, allowing to maintain substantially unaltered the isotropic arrangement of the fibers of the SMC semi-finished product. The article 30 resulting from the molding process according to the invention will therefore be characterized by a surface finishing substantially free from defects.

In the calculation of the surface of coverage the entire development of the surfaces 31, 32 of the shape is considered, including flat portions, protrusions and depressions, not the frontal area resulting, for example, on the opening plane P of the mold. However, it has been experimentally verified that in the calculation of the coverage surface it is possible to disregard details having thin thickness, such as the ribs.

It will be understood that during the molding process there will be a greater sliding of the material for lower percentages of coverage, i.e. close to 70%, and a sliding substantially zero for the highest percentages of coverage, namely close to 99%. Through experimental tests it has been verified that the lowest percentages of coverage are more suitable for articles having thicknesses in the order of 2 mm, where the sliding of the material is in any case very limited, while higher percentages of covering are more suitable to articles having thicknesses in the order of 4 mm, where instead there is a greater sliding of the material during the molding process.

According to a preferred embodiment of the invention, the process can include a step of adding one or more layers of a pre-impregnated fabric of unidirectional carbon fibers, arranged in contact with one or both surfaces of the SMC semi-manufactured product 10 intended to come into contact with the surfaces 31, 32 of the shape, thus intended to form the outer surfaces of the article.

The pre-impregnated material which is used can for example comprise a matrix of heat-hardening resin, for example epoxy, in which a plurality of carbon fibers arranged in parallel are immersed. The use of one or more additional layers comprising unidirectional carbon fibers allows to further improve the surface finishing, thereby obtaining a product essentially free from surface defects.

The overlap of one or more layers of pre-impregnated fabric with unidirectional carbon fibers also advantageously allows to improve the mechanical characteristics of the article, for example being able to choose a fiber orientation according to the direction of the loads which will stress it in operation. This feature is very important in the manufacture of articles intended for a use both aesthetic and structural.

The material used in this step can for example be a pre-impregnated fabric of unidirectional fibers having a carbon content comprised between 20 and 140 g/m$^2$, preferably equal to about 40 g/m$^2$.

To facilitate the evacuation of air and other volatile substances trapped between the layers, so as to avoid the formation of bubbles and further improve the surface finishing, it is advantageous to make cuts on the unidirectional fibers.

The cuts are preferably inclined with respect to the fiber direction and arranged so that consecutive cuts in such direction are partially misaligned with each other, namely involving only in part the same fibers.

In particular, the angle of inclination of the cuts compared to the fibers is between 30° and 60°, for example 45°, and the consecutive cuts in the direction of the carbon fibers have in common at most 50% of the fibers. These features allow the elimination of air and other volatile substances without weakening the layer of pre-impregnated fabric of unidirectional fibers.

Moreover, always with the aim of allowing the removal of air and other volatile substances without weakening the layer of pre-impregnated fabric of unidirectional fibers, the cuts have a length comprised between 1 and 20 mm, for example 5 mm, and are spaced from each other by an interval of between 5 and 100 mm, for example 50 mm.

As an alternative to the pre-impregnated fabric of unidirectional carbon fibers, it is possible to use one or more sheets of nonwoven carbon, fiber glass or acrylic fabric, which, as in the previous case, can be arranged in contact with one or both surfaces of the SMC semi-finished product intended to come into contact with the front and rear shapes. The material used can have a carbon content comprised between 40 and 200 g/m$^2$, preferably equal to about 100 g/m$^2$.

Figure 2:
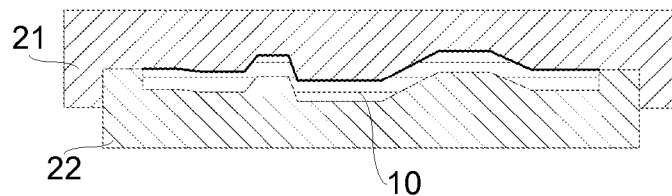
Figure 3:
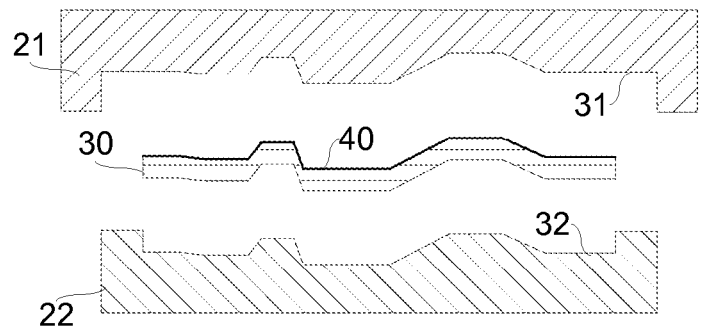

FIGS. 1 to 3 show for example a single layer 40 of a pre-impregnated fabric arranged on the surface of the SMC semi-finished product intended to come into contact with the surface 31 of the shape formed in the mold 20.

It is also possible to provide the combined use of at least one layer of a fabric pre-impregnated unidirectional carbon fibers and at least one sheet of nonwoven carbon fabric, fiber glass or acrylic material, on one or both surfaces of the SMC semi-finished product intended to come into contact with the front and rear shapes. In this case, thanks to the improved aesthetic characteristics, the layers of nonwoven fabric are preferably arranged in contact with the surfaces 31, 32 of the shape and are therefore intended to constitute the outer surfaces of the article.

The loading of the SMC semi-finished product 10 in the mold 20 is carried out at atmospheric pressure and requires a time comprised between 10 and 60 seconds. The mold 20, preheated to a temperature between 120 and 150° C., is then closed by starting a cycle of compression in an autoclave according to a predetermined time-pressure law.

Figure 4:
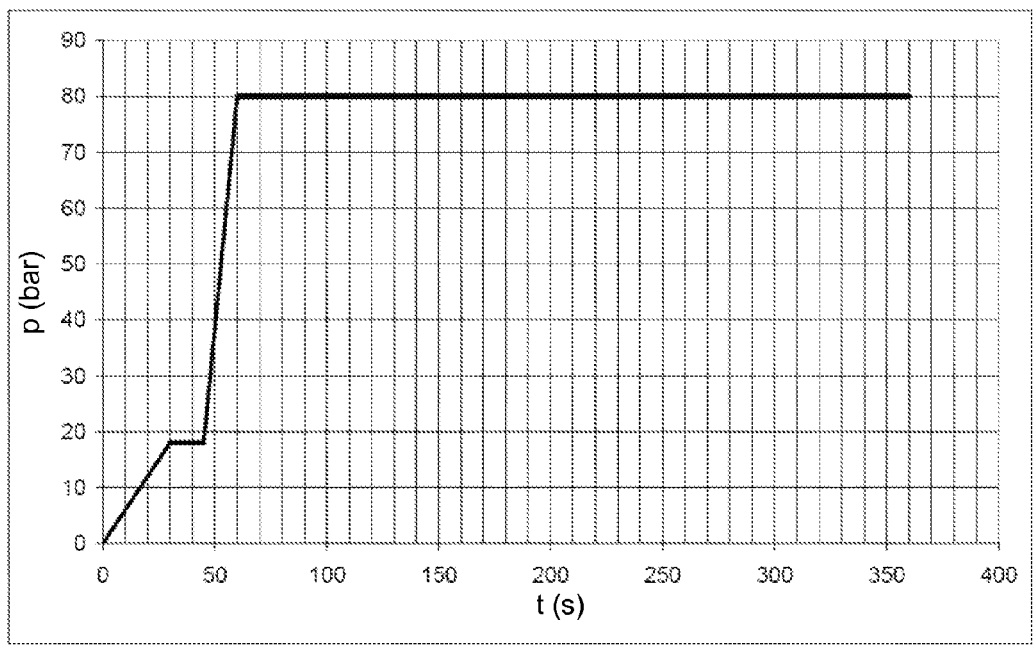
FIG. 4 is a diagram showing the progress in time of the pressure during the molding process according to the invention.

With reference to the diagram of FIG. 4, the pressure is increased, for example according to a linear law, to a value comprised between 15 and 25 bar, preferably equal to about 18 bar, in a time equal to about 30 seconds. This pressure condition is maintained for a time comprised between about 10 and 20 seconds, for example 15 seconds, after which the pressure is rapidly increased to values between 70 and 90 bar, for example 80 bar. Also in this case the increase in pressure can follow a linear law.

The article is then maintained in these conditions of pressure and temperature for about 300 seconds, after which the pressure is reduced to environmental values, the mold 20 is opened and the article 30 is extracted, being cooled on special shapes suitable for preventing deformation and finally subjected to the finishing workings such as, for example, the removal of the molding burrs.

The embodiments of the invention here described and illustrated are only examples susceptible of numerous variants. For example, always with the object of minimizing the displacements of the carbon fibers and, more generally, the flows of material inside the mold, in the manufacture of strongly asymmetric pieces with the same percentage of coverage it is possible to provide a shaping step of the SMC semi-finished product according to the plan shape of the article to be manufactured.

The invention claimed is:

1. A heat compression molding process for the manufacturing of composite material articles, comprising:
  i) Providing a mold with shaped surfaces in which the negative shape of an article to be manufactured is formed;
  ii) Determining the volume of the article to be manufactured;
  iii) Calculating the weight of an SMC semi-finished product to be inserted in the mold based of the dimensions of the article to be manufactured, wherein the SMC semi-finished product includes one or more sheets of composite material comprising a matrix of a heat-hardening resin and carbon fibers;
  iv) Calculating the dimensions of the SMC semi-finished product needed to contact the shaped surfaces of the mold to minimize sliding of the SMC semi-finished product, the calculated dimensions based on the calculated weight of the SMC semi-finished product to be inserted in the mold;
  v) Pre-heating the mold at a temperature suitable to allow the cure of the heat-hardening resin;
  vi) Inserting the SMC semi-finished product into the mold, wherein the surfaces of the SMC semi-finished product cover the surfaces of the shape of the mold in a percentage higher than 80% and less than or equal to 99%;
  vii) Closing the mold; and
  viii) Arranging the mold in an autoclave;
  ix) Carrying out a compression cycle in the autoclave according to a predefined time-pressure law;
  x) Opening the mold;
  xi) Extracting the article from the mold, wherein isotropic arrangement of the carbon fibers is substantially unaltered.

2. A molding process according to claim 1, wherein the computation of the coverage surface the whole development of the surfaces of the shape is considered.

3. A molding process according to claim 1, wherein the heat-hardening resin forming the SMC semi-finished product is selected from the group consisting of vinyl-ester, phenolic, epoxy, polyester, polyamide, cyano-ester resins and combinations thereof.

4. A molding process according to claim 1, wherein the carbon used is in the form of filaments having a length between 5 and 200 mm and each filament is made with a number of carbon fibers between 3000 and 24000.

5. A molding process according to claim 1, wherein the amount of carbon fibers varies from 25% to 75% by weight of the heat-hardening resin.

6. A molding process according to claim 1 further comprising a step of adding one or more layers of a pre-impregnated fabric with unidirectional carbon fibers, or one or more sheets of a carbon nonwoven fabric, the layers or sheets being arranged in contact with one or both surfaces of the SMC semi-finished product intended to contact the shaped surfaces of the mold.

7. A molding process according to claim 6, wherein the pre-impregnated material comprises a heat-hardening resin matrix in which a plurality of carbon fibers arranged parallel to each other are immersed.

8. A molding process according to claim 7, wherein the pre-impregnated fabric has a carbon content between 20 and 140 $g/m^2$.

9. A molding process according to claim 6, wherein the nonwoven fabric has a carbon content between 40 and 200 $g/m^2$.

10. A molding process according to claim 6 further comprising a step of cutting the one or more layers of pre-impregnated fabric with unidirectional carbon fibers.

11. A molding process according to claim 10, wherein the cuts are inclined with respect to the direction of the carbon fibers by an angle between 30° and 60° and in that subsequent cuts along the direction of the carbon fibers are partially misaligned and arranged so as to share a maximum of 50% of the fibers.

12. A molding process according to claim 10, wherein the cuts have a length between 1 and 20 mm and their relative distance is between 5 and 100 mm.

* * * * *